United States Patent [19]
Gernert et al.

[11] 3,778,273
[45] Dec. 11, 1973

[54] PHOTOGRAPHIC MATERIAL

[75] Inventors: Herbert Gernert, Munich; Hans Glockner, Pullach; Ernst Meier, Munich; Hans Ohlschlager, Cologne; Oskar Riester, Leverkusen, all of Germany

[73] Assignee: AGFA-Gevaert Aktiengesellschaft, Leverkusen, Germany

[22] Filed: June 28, 1972

[21] Appl. No.: 267,168

[30] Foreign Application Priority Data
June 30, 1971 Germany.................... P 21 32 393.3

[52] U.S. Cl.................. 96/84 R, 117/33.3, 252/300
[51] Int. Cl............................................... G03c 1/89
[58] Field of Search..................... 96/84 R; 117/33.3; 252/300

[56] References Cited
UNITED STATES PATENTS

| | | | |
|---|---|---|---|
| 3,485,632 | 12/1969 | Ohlschlager et al. | 96/84 R |
| 3,471,293 | 10/1969 | Ohlschlager et al. | 96/84 R |
| 3,723,128 | 3/1973 | MacDonald et al. | 96/84 R |
| 3,502,474 | 3/1970 | Tsuda et al. | 96/84 R |
| 3,480,436 | 11/1969 | Wilson | 96/84 R |
| 3,469,985 | 9/1969 | Bailey | 96/84 R |
| 3,468,883 | 9/1969 | Bailey | 96/84 R |
| 3,316,091 | 4/1967 | Rossi et al. | 96/84 R |
| 3,440,051 | 4/1969 | Bailey | 96/84 R |

*Primary Examiner*—Norman G. Torchin
*Assistant Examiner*—Edward C. Kimlin
*Attorney*—Arthur G. Connolly et al.

[57] ABSTRACT

Antihalation layers or filter layers for photographic materials containing a combination of the following dyes: (I) Condensation products of alkoxyaldehydes with pyrazolones in which the dye molecule contains an acid group, a diffusion-preventing radical and in addition an alkoxy substituted phenyl ring, (II) tri- or pentamethine oxonoles of alkyl substituted thiobarbituric acids preferably in form of their silver salt and (III) color lakes of aurin tricarboxylic acid. Said antihalation layers or filter layers absorb predominantly in the blue and green region of the spectrum and can be decolorized as completely as possible even if a filter is processed automatically in a roll development machine with a very rapid through-put.

6 Claims, No Drawings

PHOTOGRAPHIC MATERIAL

The invention relates to antihalation layers for photograpic materials.

It is known to apply colored layers of gelatine or lacquer to the rear surface of photographic films to obtain efficient protection against halation. These layers either lose their color during processing or contain binders which are soluble in the processing baths. It is advantageous to arrange the antihalation layers directly below the silver halide emulsion layer because the reflection of light from the support is thereby reduced and the sharpness of the image improved. In color films it is customary to arrange filter layers between the individual silver halide emulsion layers so that the emulsion layer situated below the filter layer is exposed only to radiation of the desired wavelength. Color reproduction in the indivual layers can thereby be improved.

Dyes suitable for these purposes must satisfy special requirements. They must be fixed in a diffusion-fast form in the antihalation or filter layer, they must have the necessary spectral absorption properties and they must be decolorized as completely as possible by the photographic baths during processing. Dyes which have good resistance to diffusion generally have the disadvantage that they do not decolorize completely and residues of color remain in the photographic materials. This residual coloring is particularly disturbing when an opaque support layer such as paper is used.

It is known to use condensation products of alkoxy aldehydes with pyrazolones as diffusion-fast dyes for yellow filter layers in color films. The use of dyes from the oxonole series or color lacquers of aurin tricarboxylic acid for the preparation of antihalation and filter layers is also known.

It is an object of the invention to develop antihalation layers or filter layers for photographic materials, which layers absorb predominantly in the blue and green region of the spectrum and which can be decolorized as completely as possible even if a film is processed automatically in a roll development machine with a very rapid through-put.

It now has been found photographic materials having at least one antihalation or filter layer arranged between two light sensitive silver halide emulsion layers or between a silver halide emulsion layer and a support layer, said antihalation or filter layer containing a combination of the following dyes: (I) Condensation products of alkoxyaldehydes with pyrazolones in which the dye molecule contains an acid group, a diffusion-preventing radical and in addition an alkoxy substituted phenyl ring, (II) a salt of tri- or pentamethine oxonoles of alkyl substituted thiobarbituric acids preferably their silver salt and (III) color lakes of aurin tricarboxylic acid. It is surprising that a combination of dyes from these classes are decolorized much more easily then the individual dyes or a combination of two dyes and the finished images are practically free from residual coloring. In addition, high absorption values and hence better protection against halation and better sharpness are obtained with such a combination.

The decolorization of condensation products of alkoxy aldehydes with pyrazolones depends on the chain length of the diffusion preventing radical. Optimum results are obtained with a chain length of seven to 11 carbon atoms. The choice of chain length depends in each case on the pH of the processing bath and the time taken for the photographic material to run through the development machine. The decolorization of the antihalation or filter layers according to the invention depends also on the thickness of the emulsion and gelatine layers above them and the thinner these layers are, the more efficient is the decolorization. The following dyes, for example, are suitable:

I,1 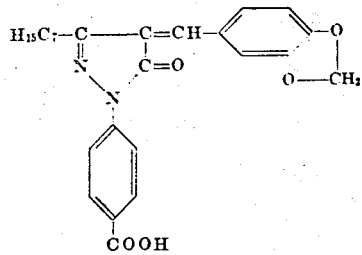

I,2 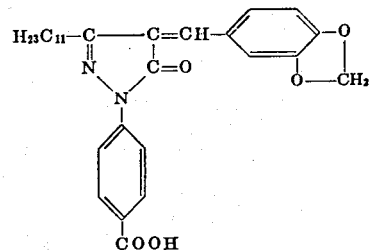

I,3 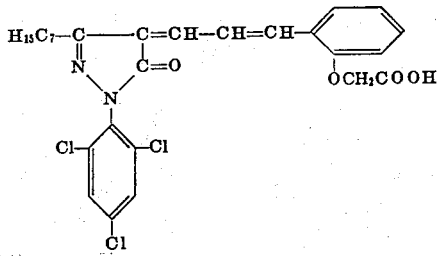

I,4 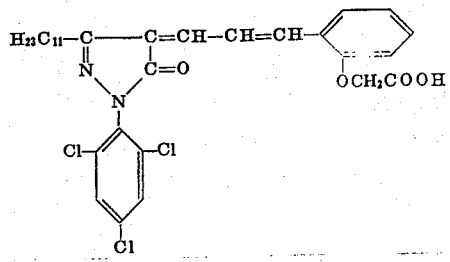

The dyes are prepared according to methods known in the literature by condensation of an alkoxyaldehyde with suitable pyrazolones.

Compound I, 1 of the table of formulae for example is prepared as follows:

660 g 1-(4′-carboxyphenyl)-3-heptyl-5-pyrazolone and 400 g piperonal are heated in an oil bath at a temperature of 160°–165°C for about 30 minutes. Thereafter, the reaction mixture was diluted with 6,5 l. of hot propanol. The dye precipitates upon cooling and may be recrystallized from propanol.

Compound I, 3 of the table of formulae is prepared as follows:

71 g of o-carboxymethoxy-cinnamic aldehyde, 169 g 1-(2,4-6-trichlorophenyl)-3-heptyl-5-pyrazolone and 48,4 ml of triathylamin were boiled with 300 ml of pyridine for 10 minutes. The solution was then diluted with 2 l of $H_2O$ and acidified with 320 ml of concentrated HCl and 800 ml $H_2O$. The dye precipitates and was recrystallized from 1200 ml of acetic acid. II Tri- or pentamethineoxonoles of alkyl substituted thiobarbituric acids:

| | Structure | M.P. |
|---|---|---|
| II, 1 | (structure) | F.P. 257–259°. |
| II, 2 | (structure) | F.P. 223°. |
| II, 3 | (structure) | F.P. 219–221°. |
| II, 4 | (structure) | F.P. 171–172°. |
| II, 5 | (structure) | F.P. 157°. |
| II, 6 | (structure) | Fp. 187° |
| II, 7 | (structure) | F.p. 114°. |
| II, 8 | (structure) | F.p. 233–235°. |
| II, 9 | (structure) | F.p. 134°. |
| II, 10 | (structure) | F.P. 230–232°. |
| II, 11 | (structure) | F.P. 140–142°. |

II, 12 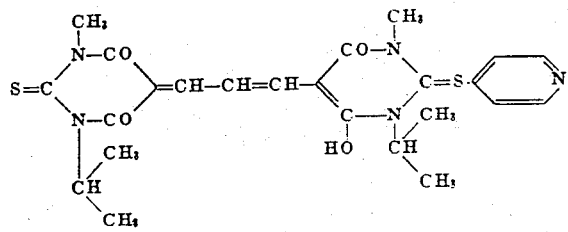 F.P. 296° (Zers.).
II, 13 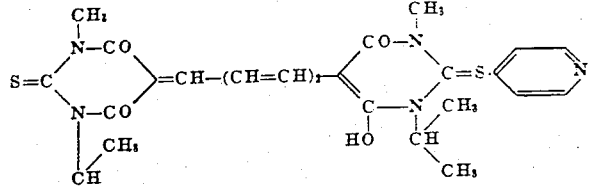 F.P. 223–225°.
II, 14 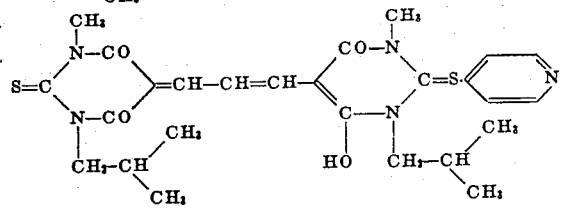 F.P. 218–223°.
II, 15 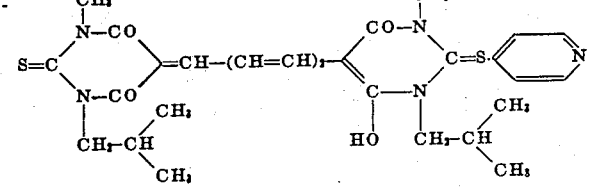 F.P. 137–140°.
II, 16 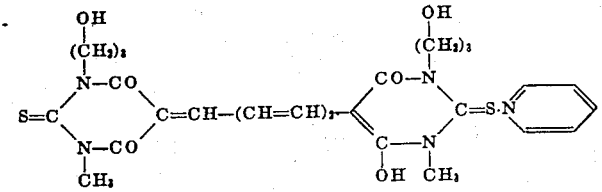 F.P. 183–185° (Zers.).
II, 17 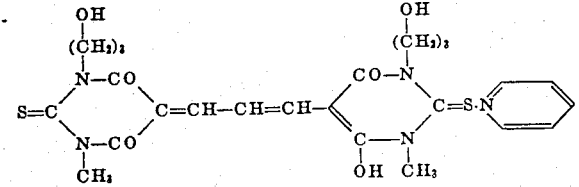 F.P. 219° (Zers.).
II, 18 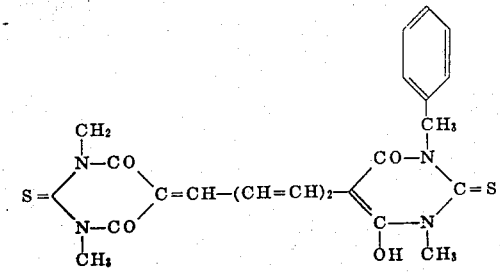 F.P. 173–176°.
II, 19 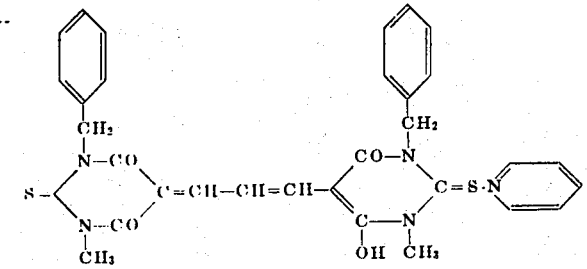 F.P. 226–228°.

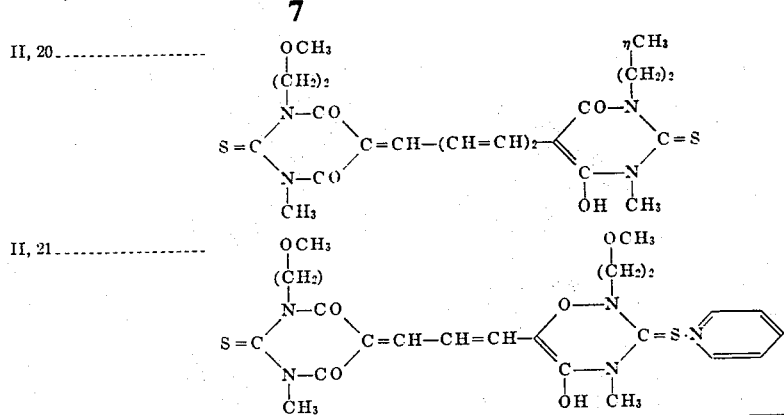

| | II, 20 | II, 21 |
|---|---|---|
| F.P. | 153-155° | 191-193° (Zers.). |

These dyes may be prepared by known processes as described in U.S. Pat. Specification No. 3,471,293, where is described the use of these dyes in form of their silver salt. The use of dyes in form of their organic salt has been described in the French Pat. Specification No. 7,106,851.

Reaction products of salts of aluminium, chromium, iron, cerium, zirconium, thorium, beryllium, gallium and indium and of other salts with aurin tricarboxylic acid may be used for the color lakes of aurin tricarboxylic acid (see Beilsteins Handbuch der Org. Chemie, 4th Edition, 2nd Supplement, Volume 10, page 774).

The antihalation layers according to the invention may be used for any conventional photographic materials which contain one or more light sensitive silver halide emulsion layers. The layers containing the dye combination may be arranged on one or both sides of the support. They may be arranged both on the back of the support and between the support and a light sensitive layer.

The supports may consist of the usual materials used for photographic supports, e.g. foils of cellulose esters, polycarbonates, especially those based on bis-phenylolalkanes, polyesters, especially polyethyleneterephthalate, etc...

The most suitable binder for the antihalation or filter layers is gelatine but this may be completely or partly replaced by other hydrophilic binders such as polyvinyl alcohols, poly-N-vinylpyrrolidone, carboxymethylcellulose and in fact any cellulose derivatives, alginic acid or its derivatives. In practice, the dyes according to the invention are first dissolved in the usual manner in water or a mixture of water and a water-soluble solvent such as lower alcohols and then added to the gelatine casting solution. The layers containing the dyes are cast and dried in the usual manner. The finished layers contain a total quantity of dyes of 100 to 1,000 mg/m². The proportions of the individual dyes in the total quantity may vary within wide limits according to the desired absorption properties of the dye layer. The following Examples illustrate the invention:

EXAMPLE 1

The following dye dispersions are first prepared. Dye dispersion A:

10 g of Dye I, 3 are dissolved in 40 g of ethyl acetate, 5 ml of dibutylphthalate are added and the solution is then dispersed in 400 ml of a 5 percent aqueous gelatine solution containing sodium dodecylsulfonate as emulsifier, and the dispersion is made up to 1 litre with water. Dye dispersion B:

The following solutions are added to 260 ml of a 10% aqueous gelatine solution with vigorous stirring:
10 ml of 7.5 percent aqueous saponin solution
14.8 ml of N/10 silver nitrate solution
0.13 g of Dye II, 3 and
0.52 g of Dye II, 4 dissolved in
20 ml of methanol and 1.3 ml of N/10 triethylamine solution.

The resulting solution of dye is shredded when solidified and then washed in water. The dyes are obtained in the form of their silver salts. Dye dispersion C:

The following solutions are added to 700 ml of a 14 percent aqueous gelatine solution at 60°C with vigorous stirring:
100 ml of 20 percent aqueous ammonia solution
20 g of aurin tricarboxylic acid dissolved in 200 ml of 4 percent aqueous ammonia
10 g of $K_2SO_4 \cdot Al_2(SO_4)_3$ dissolved in 500 ml of water
80 g of gelatine
290 ml of 31 percent aqueous acetic acid.

The resulting dye dispersion is shredded when solidified and then washed in water. Processing:

Eight different antihalation layers containing all the possible combinations of Dyes A, B and C in optimum proportions are cast on an opaque layer support of polycarbonate based on 4,4'-bis-phenylolpropane. The thickness of these antihalation layers is about 1.5 μ. The composition and quantitative proportions are summarised in Table 1.

TABLE 1

| | Samples | | | | | | | |
|---|---|---|---|---|---|---|---|---|
| | 1 | 2 | 3 | 4 | 5 | 6 | 7 | 8 |
| H₂O in ml | 500 | 500 | 500 | 500 | 500 | 500 | 500 | 500 |
| Gelatine in g | 33 | 32 | 28 | 31 | 27 | 26 | 30 | 25 |
| Dye dispersion A in g | | 100 | | | 100 | 100 | | 100 |
| Dye dispersion B in g | | | 25 | | 25 | | 25 | 25 |
| Dye dispersion C in g | | | | 12.5 | | 12.5 | 12.5 | 12.5 |
| 5% aqueous saponin solution in ml | 40 | 40 | 40 | 40 | 40 | 40 | 40 | 40 |
| 5% aqueous Raschit solution in ml | 1 | 1 | 1 | 1 | 1 | 1 | 1 | 1 |

A silver halide gelatine emulsion containing gelatine and silver in the proportion of 1.1 : 1 (based on AgNO₃) is applied in a thickness of 6 μ to the antihalation layer. After exposure, the resulting photographic material is developed for 2 minutes at 25°C in a roll development machine using a 1-phenylpyrazolidone hydroquinone developer adjusted to pH 9.7 and then fixed in a rapid fixing bath. The colors of the antihalation layers, their density measurements found under conditions of reflected light behind blue, green and red filters and the color tone of the residual color after the photographic material has run through the roll development machine are summarised in Table 2.

TABLE 2

| Sample | Color of antihalation layer | Measured values behind Blue filter | Green filter | Red filter | Residual coloring after processing |
|---|---|---|---|---|---|
| 1 | colorless control sample | 0.04 | 0.04 | 0.04 | none |
| 2 | yellow | 0.64 | 0.14 | 0.04 | slight yellow coloring |
| 3 | blue | 0.14 | 0.27 | 0.26 | slight blue coloring |
| 4 | red | 0.24 | 0.20 | 0.06 | pink |
| 5 | yellow green | 0.77 | 0.35 | 0.25 | slight yellow green coloring |
| 6 | orange | 0.75 | 0.27 | 0.04 | slight orange coloring |
| 7 | lilac | 0.22 | 0.38 | 0.27 | slight lilac coloring |
| 8 | brown | 0.80 | 0.44 | 0.25 | no coloring, practically the same as 1 |

EXAMPLE 2

The experiments were carried out as described in Example 1. Dye dispersion A contains Dye I,4 instead of compound I,3 in the same quantity. Dye dispersions B and C have the same composition.

The photographic material is worked up in the same way as described in Example 1. The residual coloring of eight samples after processing are indicated in the following table.

TABLE 3

| Sample | Color of antihalation layer | Values measured behind Blue filter | Green filter | Red filter | Residual coloring after processing |
|---|---|---|---|---|---|
| 1 | | 0.04 | 0.04 | 0.04 | none |
| 10 | yellow | 0.30 | 0.08 | 0.04 | yellow coloring |
| 11 | blue | 0.14 | 0.28 | 0.26 | slight blue coloring |
| 12 | red | 0.24 | 0.21 | 0.05 | pink |
| 13 | grey | 0.36 | 0.32 | 0.28 | yellow green coloring |
| 14 | pale brown | 0.38 | 0.24 | 0.05 | yellow brown coloring |
| 15 | lilac | 0.22 | 0.39 | 0.27 | slight lilac coloring |
| 16 | grey brown | 0.45 | 0.41 | 0.28 | barely perceptible yellowish coloring |

What we claim is:

1. A light sensitive photographic material having on a support at least one silver halide emulsion and an antihalation or filter layer, which antihalation or filter layer contains a dye combination of (I) condensation products of alkoxybenzaldehydes with pyrazolones, in which the dye molecule contains an acid group, a diffusion-preventing radical and in addition an alkoxy substituted phenyl ring, (II) a salt of tri- or pentamethine oxonoles of alkyl substituted thiobarbituric acids and (III) color lakes of aurin tricarboxylic acid.

2. A material as claimed in claim 1 in which the chain length of the diffusion preventing radical in dye (I) is between 7 and 11 carbon atoms.

3. A material as claimed in claim 1, wherein dye (II) is a silver salt.

4. A material as claimed in claim 1 in which the antihalation or filter layer is arranged between the two silver halide emulsion layers.

5. A material as claimed in claim 1 in which the antihalation or filter layer is arranged between a silver halide emulsion layer and the layer support.

6. A material as claimed in claim 1 in which the support is opaque.

* * * * *